3,790,623
CONDENSATION PRODUCTS OF GLYOXYLIC ACID ESTERS WITH AMINOTHIOLS
Jean-Pierre Fourneau, Paris, France, assignor to Laboratoires Houde, Paris, France
No Drawing. Filed Dec. 16, 1970, Ser. No. 98,921
Claims priority, application France, Dec. 19, 1969, 6944143
Int. Cl. C07c *149/20*
U.S. Cl. 260—481 R                       1 Claim

ABSTRACT OF THE DISCLOSURE

The invention relates to a therapeutical composition useful in particular for the prevention and treatment of injuries due to ionizing radiations.

Said composition comprises, as active ingredient, a compound responding to either one of the following formulae:

(A)
$$\begin{array}{c} S \\ C \diagdown CH-COOR \\ | \quad | \\ R'-CH-NH_2 \; OH \end{array}$$

or (B)
$$\begin{array}{c} S \\ CH_2 \diagdown CH-COOR \\ | \quad | \\ R'-CH---NH \end{array}$$

in which R is a straight- or branched-chain alkyl group having 1–18 carbon atoms and R' is hydrogen, —COOH or —COOR" in which R" is a straight- or branched-chain alkyl group having 1–18 carbon atoms.

The invention relates also to a process for the preparation of the active ingredient of said composition and to the new compounds of Formula A or B.

---

This invention relates to a therapeutical composition useful in particular for the prevention and treatment of injuries due to ionizing radiations, to a process for the preparation of the active ingredient of this composition and to new condensation products of glyoxylic acid esters with aminothiols.

It is known that cysteamine is an excellent radio-protector; however, it has the drawback of a relatively high toxicity which detracts from its usefulness.

It is an object of this invention to provide a therapeutical composition useful for the prevention and treatment of injuries due to ionizing radiations, having an efficiency of the same order, if not higher, than that of cysteamine, while being substantially less toxic than the latter.

The composition according to the invention is characterized in that it comprises, as active ingredient, a compound responding to either one of the following formulae:

$$\begin{array}{c} S \\ CH_2 \diagdown CH-COOR \\ | \quad | \\ R'-CH-NH_2 \; OH \end{array} \quad \text{or} \quad \begin{array}{c} S \\ CH_2 \diagdown CH-COOR \\ | \quad | \\ R'-CH----OH \end{array}$$
(A) (B)

in which R is a straight- or branched-chain alkyl group having 1–18 carbon atoms and R' is hydrogen, —COOH or —COOR" in which R" is a straight- or branched-chain alkyl group having 1–18 carbon atoms.

The active ingredient may be used as such, or in the form of an acid addition salt with a therapeutically administrable acid, such as the hydrochloride or the oxalate.

Included among the compounds of Formula A or B are in particular those corresponding to one of the following formulae:

$$\begin{array}{c} S \\ C \diagdown CH-COOR \\ | \quad | \\ CH_2-NH_2 \; OH \end{array} \quad \text{or} \quad \begin{array}{c} S \\ CH_2 \diagdown CH-COOR \\ | \quad | \\ R'-CH-----NH \end{array}$$
(A') (B')

in which R is a straight- or branched-chain alkyl group having 1–6 carbon atoms and R' is hydrogen, —COOH or —COOR" in which R" is a straight- or branched-chain alkyl group having 1–6 carbon atoms.

It will be noted that compounds of Formula B are derived from compounds of Formula A by loss of one water molecule. The bases of Formula A are generally highly unstable and are converted to the corresponding bases of Formula B. In contrast, the addition salts (hydrochloride, oxalate, and the like) of bases of Formula A are stable and are preferred.

All the compounds forming the active ingredient of the composition according to the invention are new, except those in which, in Formula B, there are simultaneously R=$CH_3$ or $C_2H_5$ and R'=H, and, in this respect, they constitute one of the objects of the invention. The compounds already known were prepared by Z. N. Pazenko (Ukrain. Khim. Zhur., 1958, 24, 632) by methods entirely different from the process claimed here, and have never been described as possessing any therapeutical activity.

The invention relates also to a process for the preparation of compounds of Formula A or B above, comprising reacting a compound of the formula:

$$HS-CH_2-CH-NH_2 \atop | \atop R'$$  (C)

with an alkyl glyoxylate of the formula $$OCH-COOR$$  (D)

or with a half-acetal-ester of the formula $$RO-CH-COOR \atop | \atop OH$$  (E)

in the presence of an alcohol of the formula ROH, R and R' having the above defined meanings, and collecting the resulting condensation product.

In the process according to the invention, the alkyl glyoxylate or half-acetal-ester is preferably used in a slight excess over the stoichiometric amount, for example in an amount of 1.1 mole per mole of compound of Formula C.

The compound of Formula C, which may be typically cysteamine, L-, D- or DL-cysteine, may be used as such or as the hydrochloride.

The reaction may be carried out in the cold or by boiling under refluxing conditions; it lasts generally several hours. The condensation product may be allowed to crystallize on cooling, and then filtered and recrystallized from a suitable solvent. The solvent may also be removed by distillation in vacuo, and the residue taken up into a small amount of water and then made neutral with an alkali metal bicarbonate solution, after which the base may be extracted with ether; the residue from the evaporation of ether is then distilled in vacuo. The resulting base may be converted to the hydrochloride, using hydrochloric acid in methanol or ethanol solution.

The esters of thiazolidine-2-carboxylic acid of Formula B in which R'=H may also be prepared by merely heating alkyl 2-(2-amino-ethylthio)glycolates of Formula A in an alcohol of formula ROH in which R is as previously defined.

The following non limiting examples are set forth to illustrate the process for the preparation of compounds of Formulae A and B. (Temperatures=° C.)

Example 1.—Methyl 2-(2-amino-ethylthio)-glycolate, hydrochloric acid salt (I) (Formula A; R=$CH_3$)

A solution of methyl glyoxylate (30 g.; 0.33 mole) in methanol (30 ml.) is added to cysteamine hydrochloride (34 g.; 0.03 mole) dissolved in methanol (150 ml.). After 3–5 hours of contact, the methanol is removed in vacuo, in a water bath at 40° C., by means of a rotary evaporator. The residue is recrystallized from 80 ml. of methanol and is then dried in a desiccator, in vacuo, over phosphorus pentoxide. Slow M.P.=108–109° (dec.). Yield: 73%.

*Analysis.*—Calculated (percent) for $C_5H_{12}ClNO_3S =$ 201.68: C, 29.77; H, 5.99; Cl, 17.58; N, 6.94; S, 15.89. Found (percent): C, 29.50; H, 5.96; Cl, 17.61; N, 7.11; S, 15.74.

Example 2.—Methyl 2-(2-amino-ethylthio)glycolate, oxalic acid salt (II)

On the one hand, freshly distilled cysteamine, 3 g.; 0.04 mole) is dissolved in ethanol (60 ml.) and, on the other hand, oxalic acid dihydrate (2.52 g.; 0.02 mole) and methyl glyoxylate (3.9 g.; 0.044 mole) are dissolved in ethanol (20 ml.). The former solution is added dropwise to the latter, with magnetic stirring. The resulting precipitate is collected, washed with ethanol and dried. M.P.=105° (dec.).

*Analysis.*—Calculated (percent) for $(C_5H_{11}NO_3S)_2$, $C_2H_2O_4$: C, 34.27; H, 5.75; N, 6.66. Found (percent): C, 34.06; H, 5.80; N, 7.24.

Example 3.—Ethyl 2-(2-amino-ethylthio)glycoate, oxalic acid salt (III) ((Formula A; R=$C_2H_5$)

The compound is prepared in the same manner as Compound II, substituting the methyl glyoxylate with ethyl glyoxylate. M.P.=81–82° (dec.).

Example 4.—Propyl 2-(2-amino-ethylthio)glycolate, oxalic acid salt (IV) (Formula A; R=$C_3H_7$)

The compound is prepared in the same manner as oxalate (III), substituting the ethyl glyoxylate with propyl 2 - propoxy - glycolate (half - acetal - ester, Formula E; R=$C_3H_7$). M.P.=98° (dec.).

Example 5.—Butyl 2-(2-amino-ethylthio)glycolate, oxalic acid salt (V) (Formula A; R=$C_4H_9$)

The compound is prepared in the same manner as Compound IV, starting from the half-acetal-butyl ester (E, R=$C_4H_9$). M.P.=102° (dec.). Yield: 61%.

*Analysis.*—Calculated (percent) for $(C_8H_{17}NO_3S)_2$, $C_2H_2O_4$; C, 42.79; H, 7.19; N, 5.55. Found (percent): C, 43.19; H, 7.36; N, 5.49.

Example 6.—Pentyl 2-(2-amino-ethylthio)glycolate, oxalic acid salt (VI) (Formula A; R=$C_5H_{11}$)

The compound is prepared in the same manner as Compound IV, starting from the half-acetal-pentyl ester (E, R=$C_5H_{11}$). M.P.=.90–92° (dec.).

Example 7.—Isopentyl 2-(2-amino-ethylthio)-glycolate, axalic acid salt (VII) (Formula A;

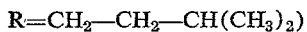

The compound is prepared in the same manner as Compound IV, starting from the half-acetal-isopentyl ester (E, R=$CH_2$—$CH_2$—$CH(CH_3)_2$). M.P.=97–98° (dec.).

Example 8.—Decyl 2-(2-amino-ethylthio)glycolate, oxalic acid salt (VIII) (Formula A; R=$C_{10}H_{21}$)

The compound is prepared in the same manner as Compound IV, starting from the half-acetal-decyl ester (E, R=decyl). M.P.=99–100° (dec.).

Example 9.—Methyl 2-L-(2-amino-2-methoxycarbonyl-ethylthio)glycolate, hydrochloric acid salt (IX) (Formula A; R=$CH_3$, R'=$COOCH_3$)

A solution of methyl glyoxylate (5 g.; 0.055 mole) in methanol (5 ml.) is added to L-cysteine hydrochloride (7.9 g.; 0.05 mole) dissolved in methanol (25 ml.). After standing twenty-four hours, the methanol is removed in vacuo, in a water-bath at 30–35° C., by means of a rotary evaporator. The residual oil crystallizes rapidly. M.P.=170° (dec.).

*Analysis.*—Calculated (percent) for $C_7H_{14}ClNO_5S$: C, 32.37; H, 5.43; Cl, 13.64; N, 5.39; S, 12.34. Found (percent): C, 32.32; H, 5.09; Cl, 13.92; N, 5.55, S, 12.51.

Example 10.—Methyl thiazolidine-2-carboxylate (X) (Formula B; R=$CH_3$, R'=H)

Method A.—Cysteamine hydrochloride (11.3 g.; 0.1 mole) or cysteamine base (7.7 g.; 0.1 mole) are dissolved in methanol (50 ml.) and methyl glyoxylate (9.7 g.; 0.11 mole) or methyl 2-methoxyglycolate (13.2 g.; 0.11 mole) are then added thereto. The reaction mixture is heated to boiling, under refluxing conditions, during four hours. The methanol is removed in vacuo, the material is then taken up into a small amount of water, neutralized with an alkali metal bicarbonate solution, and rapidly extracted with ether. The ether solution is dried over anhydrous extracted with ether. The ether solution is dried over anhydrous sodium sulfate and the ether is distilled off. The base is distilled in vacuo, B.P.$_{18}$=115°. Yield: 60%.

The hydrochloride is prepared by dissolution of the base in hydrochloric acid (in ethanol solution) and precipitation with anhydrous ether. M.P.=156–158° C.

*Analysis.*—Calculated (percent) for $C_5H_{10}ClNO_2S$: C, 32.69; H, 5.48; Cl, 19.30; N, 7.62; S, 17.46. Found (percent): C, 32.55; H, 5.57; Cl, 19.58; N, 7.73; S, 17.64.

Method B.—Methyl 2-(2-amino-ethylthio)glycolate, hydrochloric acid salt (I) (10.8 g.; 0.05 mole) is heated with methanol (30 ml.) during six hours, to boiling under refluxing conditions. After distillation of the solvent to dryness, the resulting methyl thiazolidin-2-carboxylate, hydrochloric acid salt, is recrystallized.

Example 11.—Methyl L-4-carboxy-thiazolidine-2-carboxylate (XI) (Formula B; R=$CH_3$, R'=—COOH)

A solution of methyl glyoxylate (19.5 g.; 0.22 mole) in methanol (30 ml.) is added to a suspension of L-cysteine (24.2 g.; 0.2 mole) in boiling methanol (200 ml.). The mixture becomes homogeneous, after which the slightly pink clear solution crystallizes on cooling. 17 g. of substantially pure material are collected. M.P.=149–152° C. Yield: 45%. A further 10.7 g. of product, M.P. 143–149°, are obtained after concentration of the mother-liquors. Total yield: 72%. The combined crystals are recrystallized from methanol. After desiccation in vacuo over phosphorus pentoxide at laboratory temperature, the pure methyl L-4-carboxy-thiazolidine-2-carboxylate melts at 151–152° C.

*Analysis.*—Calculated (percent) for $C_6H_9NO_4S$: C, 37.70; H, 4.75; N, 7.33; S, 16.74. Found (percent): C, 37.62; H, 5.21; N, 7.22; S, 16.88.

The following compounds may be prepared using the procedure described above for the preparation of methyl thiazolidine-2-carboxylate (X).

Example 12.—Methyl L-thiazolidine-2,4-dicarboxylate, hydrochloric acid salt (XII) (Formula B;

R=$CH_3$, R'=$COOCH_3$)

The condensation is effected from L-cysteine hydrochloride and methyl glyoxylate in methanol solution, by contact at room temperature, during several hours. The reaction mixture is concentrated in vacuo, and anhydrous ether is added to precipitate the hydrochloride. Yield: 70%. On recrystallization from three volumes of methanol and after drying in vacuo over phosphorus pentoxide, the compound melts at 182–183° C.

*Analysis.*—Calculated (percent) for $C_7H_{12}ClNO_4S$: C, 34.78; H, 5.00; Cl, 14.66; N, 5.79; S, 13.26. Found (percent): C, 34.63; H, 5.15; Cl, 14.62; N, 5.97; S, 13.25.

Example 13.—Ethyl thiazolidine-2-carboxylate, and its hydrochloride (XIII) 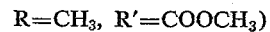

The condensation is effected from cysteamine or its hydrochloride and ethyl glyoxylate, heated under refluxing conditions, in ethanol.

Base: B.P.$_{25}$=128–130° C. Hydrochloride: M.P.=97–101° C.

*Analysis.*—Calculated (percent) for $C_6H_{12}ClNO_2S$: C, 36.45; H, 6.17; N, 7.08. Found (percent): C, 36.27; H, 6.07; N, 7.36.

Example 14.—Propyl thiazolidine-2-carboxylate, and its hydrochloride (XIV) (Formula B; R=$C_3H_7$; R′=H)

The condensation is effected from cysteamine or its hydrochloride and propyl glyoxylate, heated in propanol.

Base: B.P.$_{25}$=145° C. Hydrochloride: M.P.=85–88° C.

*Analysis.*—Calculated (percent) for $C_7H_{14}ClNO_2S$: C, 39.71; H, 6.66; Cl, 16.75; N, 6.62. Found (percent): C, 39.61; H, 6.71; Cl, 16.93; N, 6.44.

Example 15.—Isopropyl thiazolidine-2-carboxylate (XV) (Formula B; R=$CH(CH_3)_2$, R′=H)

The condensation is effected from cysteine (or its hydrochloride) and isopropyl glyoxylate in isopropanol.

B.P.$_{23}$=134° C.

*Analysis.*—Calculated (percent) for $C_7H_{13}NO_2S$: C, 47.92; H, 7.48; N, 7.99; S, 18.30. Found (percent): C, 47.84; H, 7.41; N, 7.95; S, 18.08.

Example 16.—Butyl thiazolidine-2-carboxylate (XVI) (Formula B; R=$C_4H_9$, R′=H)

The condensation is effected from cysteamine, or its hydrochloride) and butyl glyoxylate in butanol.

B.P.$_2$=128–130° C.

*Analysis.*—Calculated (percent) for $C_8H_{15}NO_2S$: C, 50.76, H, 7.99; N, 7.40; S, 16.95. Found (percent): C, 50.76; H, 7.95; N, 7.24; S, 16.98.

In the following examples the condensations are carried out as described for Compounds XIII–XVI, from cysteamine or its hydrochloride and alkyl glyoxylate or the suitable half-acetal-ester, heated in the corresponding alcohol.

Example 17.—Isobutyl thiazolidine-2-carboxylate (XVII) (Formula B; R=$CH_2$—$CH(CH_3)_2$, R′=H)

B.P.$_{17}$=139° C.

*Analysis.*—Calculated (percent) for $C_8H_{15}NO_2S$: C, 50.76; H, 7.99; N, 7.40; S, 16.95. Found (percent): C, 50.78; H, 8.20; N, 7.33; S, 16.55.

Example 18.—Sec-butyl thiazolidine-2-carboxylate (XVIII)

$$\left(\text{Formula B; R}=\underset{\underset{CH_3}{|}}{CH}-C_2H_5, \text{ R}'=H\right)$$

B.P.$_{13}$=130° C.

*Analysis.*—Calculated (percent) for $C_8H_{15}NO_2S$: C, 50.76; H, 7.99; N, 7.40; S, 16.95. Found (percent): C, 50.91; H, 8.17; N, 7.04; S, 17.10.

Hydrochloride: M.P.=39° C.

*Analysis.*—Calculated (percent) for $C_8H_{16}ClNO_2S$: C, 42.56; H, 7.14; Cl, 15.71; N, 6.20; S, 14.21. Found (percent): C, 42.35; H, 7.16; Cl, 15.71; N, 6.02; S, 14.27.

Example 19.—Pentyl thiazolidine-2-carboxylate (XIX) (Formula B; R=$C_5H_{11}$, R′=H)

B.P.$_{13}$=151° C.

*Analysis.*—Calculated (percent) for $C_9H_{17}NO_2S$: C, 53.33; H, 8.42; N, 6.89; S, 15.77. Found (percent): C, 53.30; H, 8.60; N, 6.80; S, 15.81.

Example 20.—Isopentyl thiazolidine-2-carboxylate (XX) (Formula B; R=$CH_2$—$CH_2$—$CH(CH_3)_2$, R′=H)

B.P.$_{13}$=148° C.

*Analysis.*—Calculated (percent) for $C_9H_{17}NO_2S$: C, 53.33; H, 8.43; N, 6.89; S, 15.77. Found (percent): C, 53.52; H, 8.59; N, 6.70; S, 15.40.

Example 21.—Hexyl thiazolidine-2-carboxylate (XXI) (Formula B; R=$C_6H_{13}$, R′=H)

B.P.$_{12}$=164° C.

*Analysis.*—Calculated for $C_{10}H_{19}NO_2S$: C, 55.27; H, 8.81; N, 6.44; S, 14.75. Found (percent): C, 55.42; H, 9.10; N, 6.23; S, 14.28.

Example 22.—Decyl thiazolidine-2-carboxylate, oxalic acid salt (XXII) (Formula B; R=$C_{10}H_{21}$, R′=H)

M.P.=118–120° C. (dec.)

*Analysis.*—Calculated (percent) for $C_{14}H_{27}NO_2S$, $C_2H_2O_4$: C, 52.87; H, 8.04; N, 3.85. Found (percent): C, 52.74; H, 7.75; N, 3.82.

The results of toxicological, pharmacological and biological tests reported below show the activity of the compounds prepared by the process according to the invention.

(1) Acute toxicity:

The approximate $LD_{50}$ values in mice, on intravenous, intraperitoneal or peroral administration, are as follows:

| Compounds | I | X | XI | XII | XIII | XIV | XVI |
|---|---|---|---|---|---|---|---|
| $LD_{50}$ mg./kg.: | | | | | | | |
| I.v. | 575 | | >600 | | 270 | 320 | 150 |
| I.p. | 1,000 | 400 | >1,000 | 200 | >600 | >600 | >600 |
| Per os | >1,000 | >1,000 | >1,000 | >1,000 | >1,000 | >1,000 | >1,000 |

(2) Radio-protective effects:

(A) In a first series of tests, experiments were carried out with each Compound I, X, XI and XII of the preceding examples, in the following manner:

(a) A first lot of six mice was subjected to X-ray irradiation sufficient so that all animals die within 30 days, 50% of the animals having died by the tenth day (850 roentgens, within about ten minutes). This first lot was administered intraperitoneally 10 ml./kg. of solvent for the compound. In all four cases, the survival time for 50% of the animals (ST 50) was of ten days and no mouse survived by the 30th day.

(b) A second lot of five male mice was not subjected to irradiation but was administered intra-peritoneally the maximum dose tolerated (MDT) of the test compound, dissolved in 10 ml./kg. of solvent. In all four cases, the mice survived on the 30th day.

(c) A third lot of fourteen mice (seven male and seven female) was irradiated with the same X-ray dose as the first lot and was treated intra-peritoneally, in the same manner as the second lot, with the maximum dose tolerated (MDT) dissolved in 10 ml./kg. of solvent. The following data were recorded: total number of fatal issues, 50% survival time (ST 50), variation of this 50% survival time with respect to that (ten days) of untreated irradiated mice, and number of mice surviving on the 30th day.

In the following table: Miglycol is a trade name for a mixture of $C_8$–$C_{12}$ fatty acid triglycerides (Noble Hochst Chimie).

TABLE I

| | Compound | | | |
|---|---|---|---|---|
| | I | X | XI | XII |
| Solvent | Distilled Water | Distilled Water | Miglycol | Distilled water |
| MDT, mg./kg. | 250 | 200 | 500 | 100 |
| Total number of fatal issues | 0/14 | 5/14 | 8/14 | 11/14 |
| ST 50, days | >30 | >30 | 15 | 10 |
| Variation of ST 50, days | >30 | >30 | +5 | 0 |
| 30th day survival | 14/14 | 9/14 | 6/14 | 3/14 |

In another series of tests, compound (XVI) was experimented under analogous conditions (solvent=Miglycol). The results obtained with such tests are summarized in following Table II.

TABLE II

| Number of animals per lot | Irradiation Dose (r) | Irradiation Time, min. | Dose of (XVI), mg./kg., i.p. (10 min. prior to irradiation | Volume injected (ml.) | Survival rate on the 30th day | Average survival time (days) | ST 50 (days) |
|---|---|---|---|---|---|---|---|
| 10 female | 1,000 | 18 | 500 | 0.25 | 5/10 | 21.6 | 30 |
| Do | 1,000 | 18 | 250 | 0.12 | 2/10 | 15.5 | 12 |
| Do | 1,000 | 18 | | | 0/10 | 9 | 10 |
| 5 male | | | 500 | 0.25 | 5/5 | | |

(B) The following supplementary tests were carried out with Compound I, the outstanding efficiency of which was demonstrated above.

(1) $LD_{50}$ in mice, by the intra-peritoneal route, was determined in a more accurate manner by the "up and down" method (A. W. Kinbal, et al., Radiation Research, 1957, 7, 1) and was found to be from 850 to 965 mg./kg., i.e., about 900 mg./kg. Thus, the maximum dose tolerated, used in the tests, was set at 450 mg./kg.

(2) Investigation of the radio-protective ability

Eight lots of ten mice each were administered intra-peritoneally the maximum dose tolerated of compound, i.e., 450 mg./kg., and were irradiated at the following doses, respectively: 850r (=irradiation LD 50%)—1000r (=irradiation LD 90%) 1150r—1300r—1450r—1600r—1750r and 1900r.

During the same time, reference animals were administered intra-peritoneally the same amount per kg. of weight, and were then irradiated.

The results obtained are set forth hereinafter, in Tables III and IV.

TABLE III
SURVIVAL RATE AFTER 30 DAYS (SR 30) EXPRESSED AS PERCENTAGE

| | Reference animals | Animals having received the compound |
|---|---|---|
| Dose (r): | | |
| 700 | 100 | |
| 850 | 60 | 100 |
| 1,000 | 20 | 90 |
| 1,150 | 0 | 40 |
| 1,300 | 0 | 0 |
| 1,450 | 0 | 0 |
| 1,600 | 0 | 0 |
| 1,750 | 0 | 0 |
| 1,900 | 0 | 0 |

TABLE IV
AVERAGE SURVIVAL TIME WITHIN 30 DAYS (AST 30) EXPRESSED IN DAYS

| | Reference animals | Animals having received the compound |
|---|---|---|
| Dose: | | |
| 850 | 22.9 | 30 |
| 1,000 | 10.2 | 28.2 |
| 1,150 | 9.7 | 17.9 |
| 1,300 | | 9.5 |
| 1,450 | | 8.6 |
| 1,600 | | 9.4 |
| 1,750 | | 6.5 |
| 1,900 | | 3.6 |

It may be noted that, in the protected animals, there is a marked increase of the average survival time with respect to the reference animals.

TABLE V
50% SURVIVAL TIME (ST 50) (EXPRESSED IN DAYS)

| | Reference animals | Animals having received the compound |
|---|---|---|
| Dose: | | |
| 830 | >30 | >30 |
| 1,000 | 10 | >30 |
| 1,150 | 9.5 | 12 |
| 1,300 | | 9 |
| 1,450 | | 8 |
| 1,600 | | 9 |
| 1,750 | | 6 |
| 1,900 | | 5 |

It may be noted that ST 50 is also increased in the protected animals.

(3) Determination of the irradiation $LD_{50}$ in protected animals.

It was determined by the method of Karber. A value of $LD_{50}=1120r$ was obtained.

(4) Calculation of the dose reducing factor.

The irradiation $LD_{50}$ in unprotected animals being 857r, the following result is obtained:

$$DRF=1120/857=1.30$$

To conclude, Compound I is a radio-protector at least as efficient as cysteamine, while being substantially less toxic than the latter.

The composition according to the invention may be used for preventive or curative purposes against the disorders and injuries caused by ionizing radiations, in particular during radio-therapeutical treatment of tumors or leukemias, making it possible for the diseased system to tolerate higher—and, consequently, more efficient—doses of radiations.

The composition is administrable parenterally, rectally, orally or topically at dosages from 100 mg. to 1 g. of active ingredient per day.

For parenteral, rectal or oral administration, it is formulated typically in unit dosage form in which the active ingredient is combined with a well known vehicle or excipient suitable for the selected pharmaceutical form.

Included among the suitable vehicles or excipients, are, for example:

(1) for tablets, coated tablets or capsules: lactose, talc, starch, magnesium stearate, with the conventional suitable additives;

(2) for injectable solutions: sterile pyrogen-free water, normal saline;

(3) for suppositories: semi-synthetic glycerides, cocoa butter, and the like;

(4) for ointments, creams, lotions: petrolatum, lanolin, etc.

Illustrative of such unit dosage forms are tablets, coated tablets or capsules containing 100–500 mg. of active ingredient, ampoules containing 1–5 ml. of injectable solution containing 10 wt. percent of active ingredient in distilled water (i.e., 100–500 mg. per dose), and suppositories containing 100–500 mg. of active ingredient.

For topical administration, the composition may be formulated as ointments, creams or lotions containing 1–5 wt. percent of active ingredient together with a suitable excipient.

Having now described my invention, what I claim and desire to secure by Letters Patent is:

1. A compound of the formula:

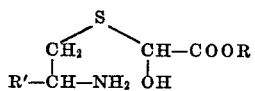

in which R is selected from the straight- and branched-chain alkyl groups having 1–18 carbon atoms and R' is selected from hydrogen, —COOH and —COOR" in which R" is selected from the straight- and branched-chain alkyl groups having 1–18 carbon atoms, and its pharmaceutically acceptable acid addition salts.

References Cited

March, Adv. Organic Chem., McGraw-Hill Inc. (1968), p. 665.

Herman et al., C.A. 72, 67238p (1970).

Kameyama et al., C.A. 74, 124716R (1971).

LORRAINE A. WEINBERGER, Primary Examiner

J. F. TERAPANE, Assistant Examiner

U.S. Cl. X.R.

260—306.7; 424—270, 311